US009688793B2

(12) United States Patent
Youk et al.

(10) Patent No.: US 9,688,793 B2
(45) Date of Patent: Jun. 27, 2017

(54) PREPARATION METHOD OF VINYL CHLORIDE POLYMER AND VINYL CHLORIDE POLYMER PREPARED THEREBY

(71) Applicant: LG CHEM, LTD., Seoul (KR)

(72) Inventors: Kyung Seog Youk, Daejeon (KR); Hyun Min Lee, Daejeon (KR); Chan Hee Lee, Daejeon (KR); Heung Kwon Bae, Daejeon (KR); Kwang Jin Lee, Daejeon (KR); Kyung Hyun Kim, Daejeon (KR); Jung Rae Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/121,683

(22) PCT Filed: Sep. 14, 2015

(86) PCT No.: PCT/KR2015/009640
§ 371 (c)(1),
(2) Date: Aug. 25, 2016

(87) PCT Pub. No.: WO2016/047952
PCT Pub. Date: Mar. 31, 2016

(65) Prior Publication Data
US 2016/0369018 A1 Dec. 22, 2016

(30) Foreign Application Priority Data
Sep. 23, 2014 (KR) .................. 10-2014-0127047
Sep. 23, 2014 (KR) .................. 10-2014-0127048
(Continued)

(51) Int. Cl.
C08F 2/00 (2006.01)
C08F 114/06 (2006.01)
C08F 14/06 (2006.01)

(52) U.S. Cl.
CPC ............ C08F 114/06 (2013.01); C08F 14/06 (2013.01)

(58) Field of Classification Search
CPC ...... C08F 114/06; C08F 14/06; C08F 214/06; C08F 259/04
(Continued)

(56) References Cited

U.S. PATENT DOCUMENTS 2,482,038 A 9/1949 Temple
2003/0027881 A1 2/2003 Sunagawa et al.
(Continued)

FOREIGN PATENT DOCUMENTS

CN 1156156 A 8/1997
CN 1756777 A 4/2006
(Continued)

Primary Examiner — William Cheung
(74) Attorney, Agent, or Firm — Dentons US LLP

(57) ABSTRACT

The present invention relates to a method of preparing a vinyl chloride polymer having good thermal stability by restraining a dehydrochlorination reaction due to heat or ultraviolet rays, and a vinyl chloride polymer prepared thereby. According to the preparation method, the adding point of a modifier is controlled, and a vinyl chloride polymer markedly restraining the generation of dehydrochloric acid due to heat or ultraviolet rays may be prepared. Therefore, the preparation method of the vinyl chloride polymer via the emulsion polymerization and the vinyl chloride polymer prepared thereby in the present invention may be readily applied to industries requiring the vinyl chloride polymer such as industries concerning a vinyl chloride resin and a molded article.

20 Claims, 4 Drawing Sheets

(30) Foreign Application Priority Data

Sep. 23, 2014 (KR) .......................... 10-2014-0127049
Aug. 27, 2015 (KR) .......................... 10-2015-0121272

(58) Field of Classification Search
USPC .............................................. 526/344.2, 233
See application file for complete search history.

(56) References Cited

U.S. PATENT DOCUMENTS

2006/0025552 A1* 2/2006 Kaiser ................... C08F 214/06
526/344
2006/0270813 A1* 11/2006 Clikeman ............... C08F 10/00
526/159

FOREIGN PATENT DOCUMENTS

| | | |
|---|---|---|
| CN | 103119073 A | 5/2013 |
| DE | 2125586 A1 | 12/1972 |
| EP | 0 107 063 A1 | 5/1984 |
| JP | 06-184220 A | 7/1994 |
| JP | 06-192523 A | 7/1994 |
| JP | 2501322 B2 | 5/1996 |
| JP | 09-137023 A | 5/1997 |
| JP | 09-241309 A | 9/1997 |
| KR | 10-2002-0037769 A | 5/2002 |
| KR | 10-2004-0050468 A | 6/2004 |
| KR | 10-2010-0005283 A | 1/2010 |
| KR | 10-2011-0006224 A | 1/2011 |
| KR | 10-2012-0007227 A | 1/2012 |
| KR | 10-2012-0130801 A | 12/2012 |

* cited by examiner

PREPARATION METHOD OF VINYL CHLORIDE POLYMER AND VINYL CHLORIDE POLYMER PREPARED THEREBY

CROSS-REFERENCE TO RELATED APPLICATIONS

This application is a National Stage Entry of International Application No. PCT/KR2015/009640, filed Sep. 14, 2015, and claims the benefit of and priority to Korean Application No. 10-2014-0127047, filed on Sep. 23, 2014, Korean Application No. 10-2014-0127048, filed on Sep. 23, 2014, Korean Application No. 10-2014-0127049, filed on Sep. 23, 2014, and Korean Application No. 10-10-2015-0121272, filed on Aug. 27, 2015, all of which are hereby incorporated by reference in their entirety for all purposes as if fully set forth herein.

TECHNICAL FIELD

The present invention relates to a method of preparing a vinyl chloride polymer having good thermal stability due to the restraint of dehydrochlorination by heat or ultraviolet rays, and a vinyl chloride polymer prepared thereby.

BACKGROUND ART

A vinyl chloride polymer is a polymer including 50% or more of vinyl chloride, is cheap, allows easy control of hardness, is applicable in most processing equipments and has diverse application fields. In addition, the vinyl chloride polymer may provide a molded product having good physical and chemical properties such as mechanical strength, climate resistance and chemical resistance, and is widely used in diverse fields.

However, the vinyl chloride polymer may induce dehydrochlorination due to the defects of chemical structures, generated during a polymerization reaction by heat or ultraviolet rays applied during processing and may induce the discoloration of a resin or the deterioration of physical properties.

Particularly, in a vinyl chloride polymer, chemical defects generated during a polymerization reaction, i.e., the defects of the chemical structures of allyl chloride and tertiary chloride are present. Due to the defects of the chemical structure, the binding energy of carbon with chlorine in the vinyl chloride polymer may be much lower than that of carbon with chlorine in a normal molecular structure, and the bonding between carbon and chlorine may be easily broken due to external radical transfer during processing the vinyl chloride polymer. Separated hydrogen chloride from a polymer chain accelerates other side reactions through an auto-catalyst reaction to produce another hydrogen chloride continuously. In addition, a double bond may be formed at the site from where the hydrogen chloride has been removed, and a number of double bonds may be overlapped to generate the discoloration of a resin and the deterioration of physical properties. That is, in a vinyl chloride polymer or a molded product processed therefrom, a dehydrochlorination reaction may be generated due to heat or ultraviolet rays, thereby generating the discoloration defects of a vinyl chloride polymer or the deterioration or change of physical properties.

In order to improve the limitations of the vinyl chloride polymer, an organometallic compound containing a metal such as Ba, Zn, Ca and Pb has been mixed with the vinyl chloride polymer to restrain the generation of radicals or ions during thermal decomposition of the vinyl chloride polymer and to control the thermal decomposition rate of a resin. Recently, a method of using a thermal stabilizer of diverse types such as a metallic material or an organic compound has been introduced. However, the use thereof is limited due to environmental problems caused by the use of a heavy metal stabilizer and high price.

A method of blending a polymer having good heat resistance with a vinyl chloride polymer has been suggested to complement weak physical properties however is not easily used due to low miscibility with the vinyl chloride polymer and difficulty in processing.

With such a background, the inventors of the present disclosure studied on a method of improving the thermal stability of a vinyl chloride polymer by effectively restraining a dehydrochlorination reaction (a dehydrochloric acid reaction), prepared a vinyl chloride polymer by adding at least one modifier of oxycarboxylates, inorganic phosphates or ethylenediamine tetraacetates to a vinyl chloride monomer and emulsion polymerizing, measured the generation degree of scale, the amount of dehydrochloric acid and thermal stability (Yellowness Index), found that the generation degree of the scale is extremely small, the amount of dehydrochloric acid is decreased, and the thermal stability (Yellowness Index) is improved, and achieved the present invention.

DISCLOSURE OF THE INVENTION

Technical Problem

The present invention provides a method of preparing a vinyl chloride polymer having improved thermal stability by restraining the dehydrochlorination reaction of a vinyl chloride polymer due to heat or ultraviolet rays via controlling inserting point of a modifier.

The present invention also provides a vinyl chloride polymer prepared by the preparation method.

Technical Solution

According to an aspect of the present invention, there is provided a method of preparing a vinyl chloride polymer including adding a modifier to a vinyl chloride monomer and conducting emulsion polymerization, wherein 0.001 to 10 parts by weight of the modifier is added relative to 100 parts by weight of the vinyl chloride monomer.

According to another aspect of the present invention, there is provided a vinyl chloride polymer prepared by the preparation method.

Effects of the Invention

According to the method of preparing a vinyl chloride polymer of the present invention, a vinyl chloride polymer allowing extremely low generation degree of scale and markedly restrained generation of dehydrochloric acid due to heat or ultraviolet rays, may be prepared by controlling adding point of a modifier.

In addition, the vinyl chloride polymer according to the invention is prepared by the above-described preparation method, and the thermal stability thereof is improved and the discoloration or the alteration of the physical properties thereof may be prevented.

Accordingly, the method of preparing a vinyl chloride polymer through the emulsion polymerization and the vinyl chloride polymer prepared thereby may be readily applied to an industry requiring the vinyl chloride polymer, for example, industries concerning a vinyl chloride resin and a molded product thereof.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

BEST MODE FOR CARRYING OUT THE INVENTION

Figure 1:
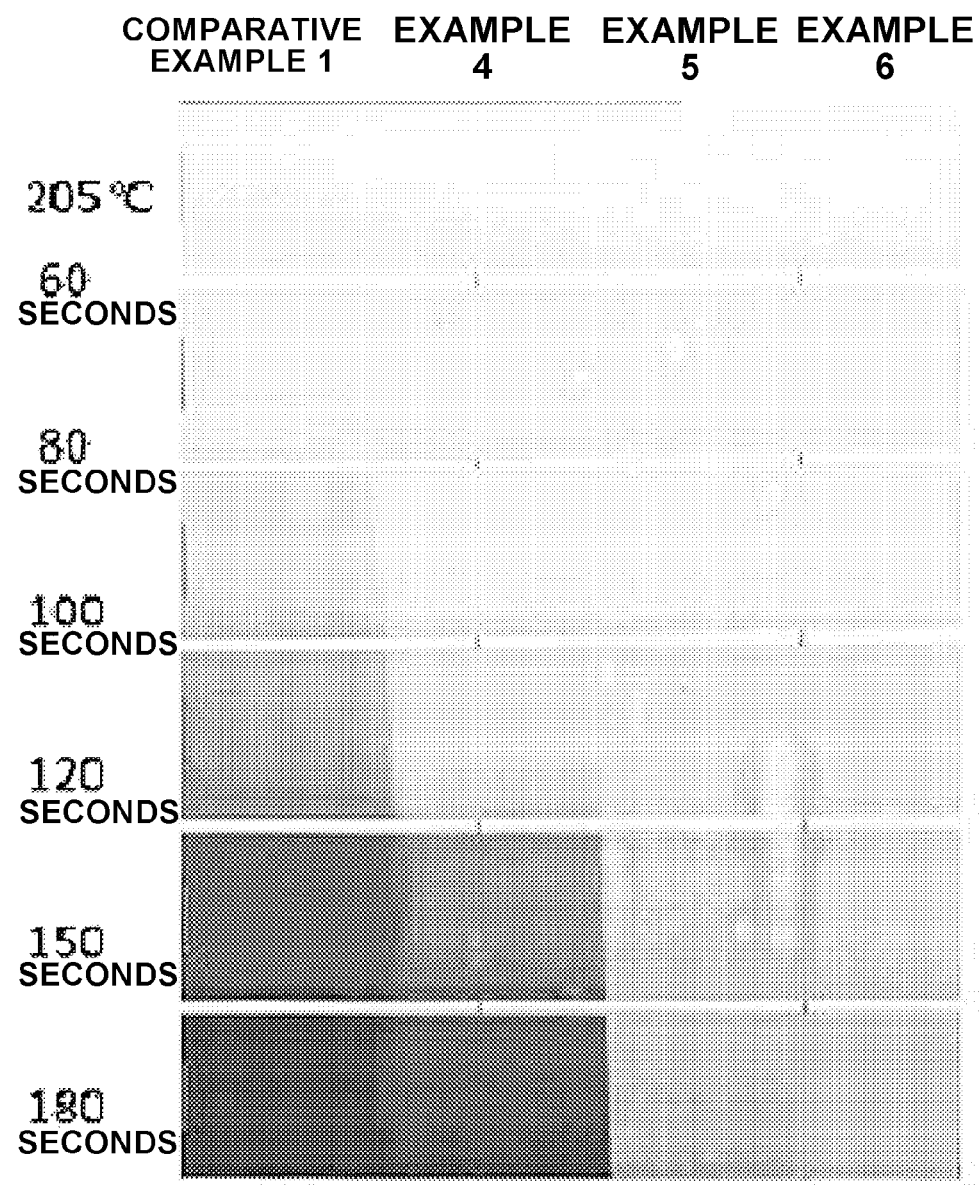
FIG. 1 illustrates the color change of vinyl chloride polymer sheets formed according to Examples 4 to 6 of the present invention and Comparative Example 1 with respect to time.
Figure 2:
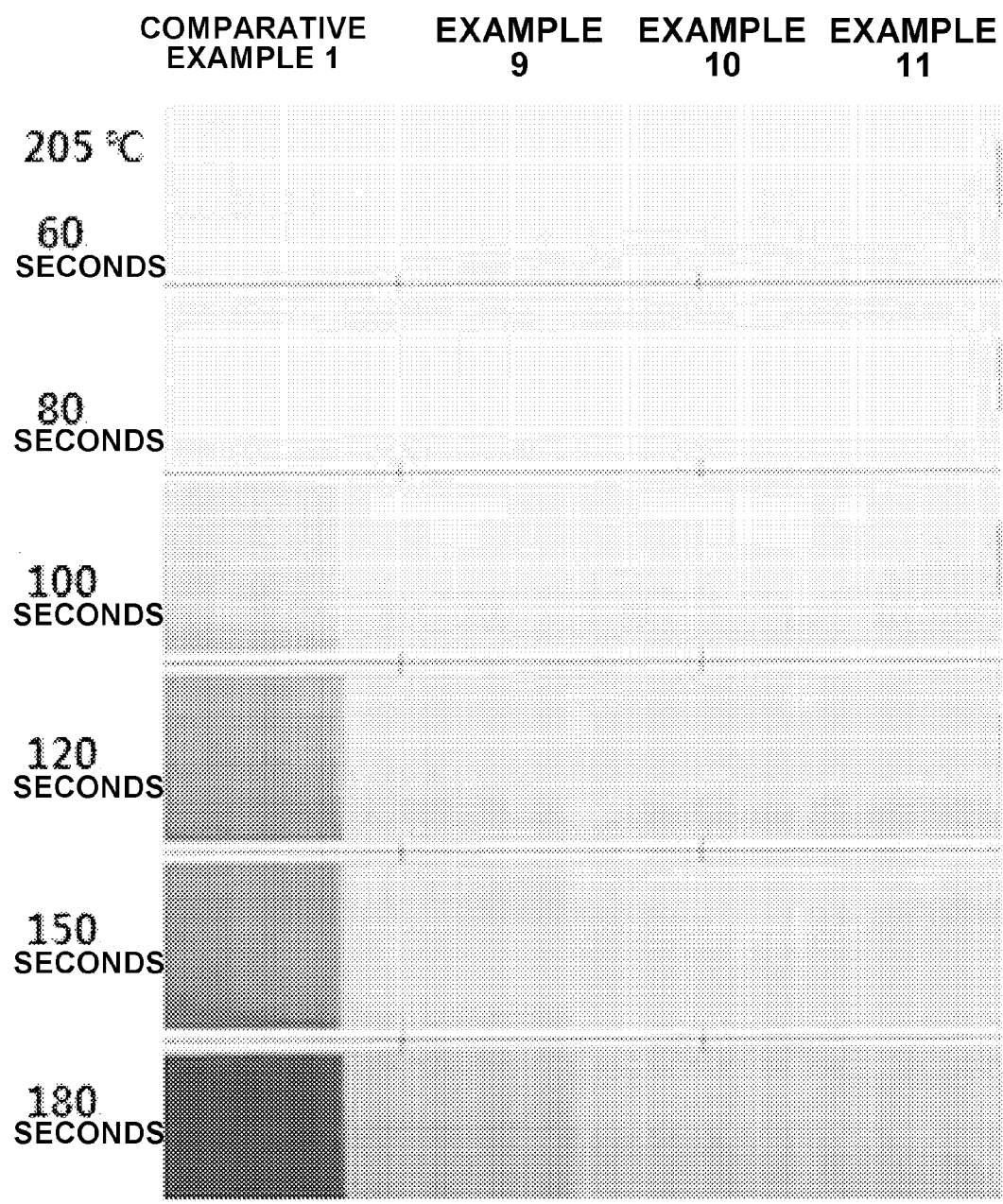
FIG. 2 illustrates the color change of vinyl chloride polymer sheets formed according to Examples 9 to 11 of the present invention and Comparative Example 1 with respect to time.
Figure 3:
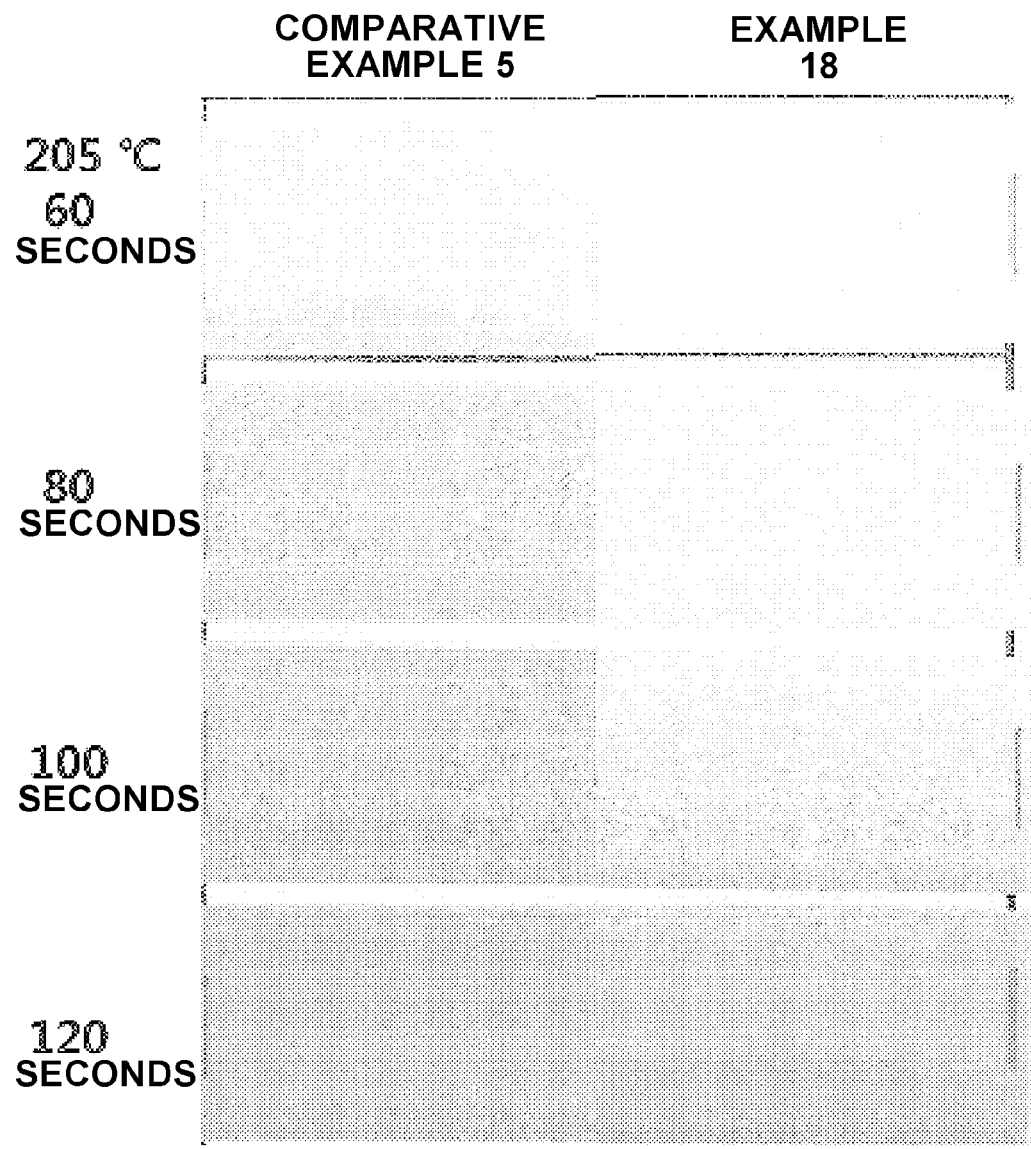
FIG. 3 illustrates the color change of a vinyl chloride polymer sheets formed according to Example 18 of the present invention and Comparative Example 5 with respect to time.

Hereinafter, the present invention will be explained in more detail to assist the understanding of the present invention.

It will be further understood that terms or words used in the description and claims should not be interpreted as having a meaning such as those defined in commonly used dictionaries, however should be interpreted as having a meaning and concept that is consistent with the technical spirit of the present invention on the basis of a principle that an inventor may define the concept of terms appropriately to explain his invention by the best way.

The present invention provides a method of preparing a vinyl chloride polymer capable of preparing a vinyl chloride polymer having good thermal stability and low discoloration degree to heat and ultraviolet rays.

The preparation method according to an embodiment of the present invention is characterized in including a step of adding a modifier to a vinyl chloride monomer and emulsion polymerizing, and adding the modifier in an amount ratio from 0.001 to 10 parts by weight relative to 100 parts by weight of the vinyl chloride monomer.

The modifier may be added all together after initiating the polymerization, or in appropriate portions in consideration of the point of a polymerization conversion ratio.

The vinyl chloride monomer may mean pure vinyl chloride monomer or a mixture of a vinyl chloride monomer with a vinyl monomer capable of conducting a copolymerization reaction therewith. That is, the vinyl chloride polymer according to the present invention may include a copolymer of a vinyl chloride monomer as a main component and a vinyl monomer capable of conducting a copolymerization reaction with the vinyl chloride monomer as well as a polymer of pure vinyl chloride monomers. In the case where the vinyl chloride polymer is the copolymer of the vinyl chloride monomer and the vinyl monomer, the copolymer may preferably include 50% or more of vinyl chloride.

The vinyl monomer capable of conducting a copolymerization reaction with the vinyl chloride monomer is not specifically limited, however may include, an olefin compound such as ethylene, propylene, and butane; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; halogenated vinylidenes such as vinylidene chloride; unsaturated fatty acid and anhydride of the fatty acid such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butylbenzyl maleate; and crosslinkable monomers such as diallyl phthalate, and the vinyl monomer may be used alone or as a mixture of two or more thereof.

The modifier according to an embodiment of the present invention restrains the dehydrochlorination of the vinyl chloride polymer and as a result, improves the thermal stability of the vinyl chloride polymer. The modifier may be added in an amount ratio from 0.001 to 10 parts by weight relative to 100 parts by weight of the vinyl chloride monomer as described above and may particularly be added in an amount ratio from 0.1 to 5 parts by weight. If the amount of the modifier is less than 0.001 parts by weight, the restraining effect of the dehydrochlorination would be trivial, and the improving effect of the thermal stability of the vinyl chloride polymer thus prepared may be deteriorated, and if the amount of the modifier is greater than 10 parts by weight, the viscosity of plastisol would increase during processing the vinyl chloride polymer thus prepared, and the processability thereof may be deteriorated, thereby deteriorating the coloring property of a molded product processed therefrom.

Particularly, the modifier may be at least one selected from the group consisting of oxycarboxylates, inorganic phosphates, and ethylenediamine tetraacetates.

The oxycarboxylate is not specifically limited, however may be, for example, citric acid or trisodium citrate.

The inorganic phosphate is not specifically limited, however may be, for example, disodium diphosphate or tetrasodium diphosphate, and may particularly be the tetrasodium diphosphate.

The ethylenediamine tetraacetate is not specifically limited, however may be, for example, disodium ethylenediamine tetraacetic acid or tetrasodium ethylenediamine tetraacetic acid, and may particularly be the tetrasodium ethylenediamine tetraacetic acid.

The emulsion polymerization according to an embodiment of the present invention may be micro-seed emulsion polymerization, microemulsion polymerization, or pure emulsion polymerization.

Hereinafter, the micro-seed emulsion polymerization, the microemulsion polymerization, and the pure emulsion polymerization will be explained in detail item by item.

The expression of "polymerization conversion ratio" used in the present invention means the polymerization conversion ratio of the vinyl chloride monomer and may be measured using a butane tracer equipped with a gas chromatograph. Particularly, a polymerization conversion ratio curve according to the ratio of a vinyl chloride monomer and butane relative to time under certain polymerization conditions is made for each polymerization condition, and a polymerization conversion ratio according to polymerization conditions may be measured relative to the curve made. In addition, the polymerization conversion ratio may include an error range accompanied with the measurement, for example, 30% may include up to ±2%.

Micro-Seed Emulsion Polymerization

If the emulsion polymerization is the micro-seed emulsion polymerization, the emulsion polymerization may include a step of preparing a seed mixture including a first seed and a second seed (step i); and a step of adding a vinyl chloride monomer and a modifier to the seed mixture, and polymerizing (step ii), and the modifier may be added at a point when a polymerization conversion ratio is 50% or more.

Step i is a step of preparing the seed mixture by mixing the first seed and the second seed, which have different average diameters to increase the binding force of the vinyl chloride monomer and to impart the vinyl chloride polymer finally produced with bimodal effect.

The seed mixture may be obtained by mixing the first seed and the second seed in an appropriate amount ratio according to design without specific limitation, and particularly, the first seed and the second seed may be mixed in an amount ratio from 1:1 to 3:1 by weight.

Hereinafter, the first seed will be explained in particular.

The first seed may be prepared by adding 100 parts by weight of the vinyl chloride monomer and 0.1 to 5 parts by weight of a first emulsifier to a reactor filled with a polymerization initiator, and homogenizing, followed by emulsion polymerizing at the temperature from 30° C. to 70° C.

The reactor filled with the polymerization initiator may be a reactor containing a mixture solution including the polymerization initiator, and the mixture solution may further include polymerization water, a separate emulsifier, a reaction inhibitor and a dispersant other than the polymerization initiator, without limitation.

The polymerization initiator may preferably be used in an amount ratio from 0.01 to 2 parts by weight relative to 100 parts by weight of the vinyl chloride monomer, and the average diameter of the first seed finally produced may be controlled by the amount used of the polymerization initiator. For example, as the amount used of the polymerization initiator increases, the average diameter of the first seed finally produced may decrease.

The kind of the polymerization initiator is not specifically limited, however at least one of a water soluble initiator or an oil soluble initiator may be used. For example, at least one selected from the group consisting of peroxy carbonates, peroxy esters and azo compounds may be used. Particularly, diisopropyl peroxy dicarbonate, t-butyl peroxy pivalate, t-butyl peroxy neodecanoate, 2,2-azobisisobutyronitrile, etc. may be used alone or a mixture of two or more thereof may be used as the polymerization initiator. Particularly, the polymerization initiator may be lauryl peroxide (LPO), di-2-ethylhexyl peroxycarbonate (OPP), or a mixture thereof.

The separate emulsifier is not specifically limited, however may be, for example, the same as a first emulsifier to be described below.

The reaction inhibitor may be paraquinone, etc.

The dispersant is not specifically limited, however may include, for example, higher alcohols such as lauryl alcohol, myristic alcohol, and stearyl alcohol; or a higher fatty acid such as lauric acid, myristic acid, palmitic acid, and stearic acid.

The homogenizing is not specifically limited, however may be conducted by homogenizing at a temperature of 20° C. or less, preferably at a temperature from 5° C. to 15° C. for 1 to 3 hours using a homogenizer. In this case, the homogenizer is not specifically limited, however a commonly known one in the art, for example, a rotor-stator type homogenizer, may be used.

The emulsion polymerization for preparing the first seed may be conducted at a temperature from 30° C. to 70° C. as described above, and may particularly be conducted by elevating the homogenizing temperature by a temperature from 40° C. to 50° C. to initiate the emulsion polymerization and emulsion polymerizing for 5 to 15 hours.

Hereinafter, the second seed will be explained in particular.

The second seed may be prepared by the following method:

a) a step of adding 100 parts by weight of a vinyl chloride monomer to a reactor filled with a first emulsifier and initiating polymerization at a temperature from 30° C. to 70° C.; and b) a step of continuously adding a second emulsifier during polymerization and conducting emulsion polymerization for 4 to 10 hours.

The reactor filled with the first emulsifier in step a) represents a reactor including an emulsion solution containing the first emulsifier, and the emulsion solution may include polymerization water, a polymerization initiator, etc. other than the first emulsifier.

The first emulsifier may be used in an amount ratio from 0.01 to 1 parts by weight relative to 100 parts by weight of the vinyl chloride monomer, and the average particle diameter of the second seed finally produced may be controlled by the amount used of the first emulsifier. For example, the average particle diameter of the finally produced second seed may increase according to the increase of the amount used of the first emulsifier.

The polymerization initiator may preferably be a water soluble initiator and may be at least one selected from the group consisting of potassium persulfate, ammonium persulfate, and hydrogen peroxide.

The second emulsifier in step b) may be continuously added to the reactor during the emulsion polymerization and may be used in an amount ratio from 0.01 to 6 parts by weight relative to 100 parts by weight of the vinyl chloride monomer.

The first emulsifier and the second emulsifier used for preparing the first seed and the second seed may be the same material or may particularly be different materials. Particularly, each of the first emulsifier and the second emulsifier may be at least one selected from the group consisting of sodium lauryl sulfate, lauryl benzene sulfonic acid, alpha-olefin sulfonate, sodium lauryl ethoxylated sulfate, sodium octadecyl sulfate, sodium lauryl ether sulfate, and linear alkylbenzene sulfonate.

To obtain vinyl chloride polymer, Step ii is a step of adding a vinyl chloride monomer to a seed mixture of the first seed and the second seed as prepared in step i, initiating polymerization, adding a modifier, and conducting polymerization.

The emulsion polymerization in step ii is not limited thereto, however may be conducted by adding a vinyl chloride monomer and a modifier to a vacuum reactor including a mixture of the seed mixture and polymerization water and conducting a reaction. The modifier may be added after initiating polymerization and may be added particularly at a point when a polymerization conversion ratio is 30% or more, and more particularly at a point when a polymerization conversion ratio is 50% or more. Still more particularly, the modifier may be added at a point when a polymerization conversion ratio is from 80% to 95%.

In addition, the reaction may be conducted by continuously adding the first emulsifier during emulsion polymerization and by additionally adding an additive such as a polymerization initiator, a molecular weight controller, and an electrolyte as occasion demands.

Particularly, the polymerization may be conducted by a method including steps of adding 100 parts by weight of a vinyl chloride monomer to a vacuum reactor including 70 to 120 parts by weight of polymerization water and 1 to 20 parts by weight of a seed mixture relative to 100 parts by weight of the vinyl chloride monomer, initiating polymerization at a temperature ranging from 30° C. to 70° C., and adding 0.001 to 10 parts by weight of a modifier relative to 100 parts by weight of the vinyl chloride monomer. The modifier may be added after initiating polymerization as described above, particularly at a point when a polymerization conversion ratio is 30% or more. In addition, 0.2 to 2.5 parts by weight of a first emulsifier may be continuously added during the reaction relative to 100 parts by weight of the vinyl chloride monomer, and 0.1 to 1.5 parts by weight of a polymerization initiator, 0.5 to 2 parts by weight of an electrolyte and 0.1 to 1 parts by weight of a molecular weight controller may be additionally added as additives relative to 100 parts by weight of the vinyl chloride monomer as occasion demands.

In this case, the modifier and the polymerization initiator may be the same as those described above, and the emulsifier may be the same as the first emulsifier and the second emulsifier as described above.

The molecular weight controller is not specifically limited, however may be, for example, n-butyl mercaptan, n-octyl mercaptan, n-dodecyl mercaptan, t-dodecyl mercaptan, etc.

The electrolyte is not specifically limited and may be at least one selected from the group consisting of potassium chloride, sodium chloride, potassium bicarbonate, sodium carbonate, potassium carbonate, potassium hydrogen sulfite, sodium hydrogen sulfite, potassium pyrophosphate, sodium pyrophosphate, tripotassium phosphate, dipotassium hydrogen phosphate, and disodium hydrogen phosphate.

Microemulsion Polymerization

If the emulsion polymerization is microemulsion polymerization, the emulsion polymerization may be conducted by steps of adding an oil soluble polymerization initiator, a vinyl chloride monomer, and a modifier to a reactor filled with a first emulsifier, homogenizing, and polymerizing at a temperature from 30° C. to 70° C.

The reactor filled with the first emulsifier represents a reactor including a mixture solution including a first emulsifier, and the mixture solution may include an additive such as polymerization water, a reaction inhibitor, and a dispersant other than the first emulsifier, without limitation. The additive may be the same as that described above.

The first emulsifier may be added in an amount ratio from 0.1 to 5 parts by weight relative to 100 parts by weight of the vinyl chloride monomer, and the particular kind of the first emulsifier may be the same as that described above.

The oil soluble polymerization initiator may be added in an amount ratio from 0.01 to 2 parts by weight relative to 100 parts by weight of the vinyl chloride monomer, and may include, for example, at least one selected from the group consisting of cumene hydro peroxide, diisopropylbenzene hydroperoxide, azobisisobutyronitrile, tertiary butyl hydroperoxide, paramentane hydro peroxide, benzoylperoxide, and di-2-ethylhexyl peroxydicarbonate, without limitation.

The modifier may be added after initiating polymerization, and may particularly be added at a point when a polymerization conversion ratio is 30% or more, and may more particularly be added at a point when a polymerization conversion ratio is 50% or more like in the micro-seed emulsion polymerization. Still more particularly, the modifier may be added at a point when a polymerization conversion ratio is from 80% to 95%.

The homogenizing may be conducted by the same method described above, and the additives such as polymerization water, a reaction inhibitor, and a dispersant, and the amounts thereof are the same as described above.

Pure Emulsion Polymerization

If the emulsion polymerization is pure emulsion polymerization, the emulsion polymerization may be conducted by adding a vinyl chloride monomer and a modifier to a reactor filled with a first emulsifier and a water soluble polymerization initiator, and conducting a polymerization reaction at a temperature from 30° C. to 70° C., and the polymerization reaction may be conducted while continuously adding a second emulsifier.

The reactor filled with a mixture of the first emulsifier and the water soluble polymerization initiator represents a reactor including a mixture containing the first emulsifier and the water soluble polymerization initiator. The mixture may further include an additive such as polymerization water, a dispersant, and a reaction inhibitor other than the first emulsifier and the water soluble polymerization initiator, and the additives may be the same as those described above.

The first emulsifier may be used in an amount ratio from 0.02 to 0.4 parts by weight relative to 100 parts by weight of the vinyl chloride monomer, and the kind of the first emulsifier may be the same as that described above.

The water soluble polymerization initiator may be used in an amount ratio from 0.01 to 2 parts by weight relative to 100 parts by weight of the vinyl chloride monomer, and the water soluble polymerization initiator may be the same as that described above.

In addition, the second emulsifier may be continuously added to the reactor during polymerizing and may be used in an amount ratio from 0.01 to 6 parts by weight relative to 100 parts by weight of the vinyl chloride monomer, and the second emulsifier may be the same as that described above.

The modifier may be added after initiating polymerization and particularly, at a point when a polymerization conversion ratio is 30% or more, and more particularly, at a point when a polymerization conversion ratio is 50% or more like in the micro-seed emulsion polymerization, and the microemulsion polymerization. Still more particularly, the modifier may be added at a point when a polymerization conversion ratio is from 80% to 95%.

The homogenizing may be conducted by the same method described above, and the additive such as polymerization water, a reaction inhibitor, and a dispersant, and the amount thereof may be the same as that described above.

The preparation method according to the present invention may further include a step of washing, flocculating, and drying after emulsion polymerizing. The drying is not specifically limited, however may be conducted by a commonly known method to a person skilled in the art.

According to the method of preparing a vinyl chloride polymer via the emulsion polymerization, the modifier may be included in the vinyl chloride polymer without arising modification of the vinyl chloride polymer finally produced, by adding the modifier after initiating polymerizing, particularly at a point when a polymerization conversion ratio is 30% or more. Therefore, dehydrochlorination may be restrained in case of exposing the vinyl chloride polymer prepared by the method to heat or ultraviolet rays.

There is also provided a vinyl chloride polymer prepared by the preparation method.

The vinyl chloride polymer according to an embodiment of the present invention is prepared by the above-described preparation method, and dehydrochlorination thereof by ultraviolet rays or heat may be restrained, and thermal stability thereof may be excellent.

Hereinafter, the present invention will be explained in more detail referring to the following examples and experimental examples. However, the examples and the experimental examples are for illustrating the present invention, and the scope of the present invention is not limited thereto.

Preparation Example 1

110 parts by weight (73 kg) of de-ionized water, 1.83 parts by weight (1.21 kg) of lauryl peroxide (LPO), and 0.001 parts by weight (0.9 g) of paraquinone were injected to a 200 L, high pressure reactor, followed by making the inner side of the reactor vacuous by reducing the pressure to −730 mmHg. To the reactor in a vacuum state, 100 parts by weight (66 kg) of a vinyl chloride monomer and 11.8 parts by weight (7.8 kg) of sodium dodecyl benzene sulfonate (15%) were injected, followed by stirring for 15 minutes. The inner temperature of the reactor was decreased to 20° C. or less, and homogenized for 2 hours using a rotor-stator type homogenizer. After completing homogenizing, the inner temperature of the reactor was decreased to 42° C. to allow polymerizing reaction. After 558 minutes, the pressure in the reactor reached 3.5 kg/cm$^2$, and the reaction was finished. Unreacted vinyl chloride monomer was recovered and removed to obtain a first seed having an average particle diameter of 0.68 μm.

Preparation Example 2

124 parts by weight (230 kg) of polymerization water, 0.54 parts by weight of a first emulsifier (lauric acid 790 g/NaOH 240 g) and 0.059 parts by weight (110 g) of potassium persulfate (KPS) were injected to a 500 L, high pressure reactor, followed by stirring and making the reactor vacuous. 100 parts by weight (185 kg) of a vinyl chloride monomer was injected to the reactor in a vacuum state, followed by elevating the temperature in the reactor to 56° C. to initiate polymerization. After initiating polymerization, 6 parts by weight (11.1 kg) of a second emulsifier (sodium dodecyl benzene sulfonate) was continuously injected to the reactor for 5 hours. After the pressure in the reactor reached 4 kg/cm$^2$, the reaction was finished. Unreacted vinyl chloride monomer was recovered and removed to obtain a second seed having an average particle diameter of 0.12 μm.

Example 1

70 parts by weight (150 kg) of de-ionized water, 7 parts by weight (15 kg) of the first seed prepared in Preparation Example 1 and 2.8 parts by weight (6 kg) of the second seed prepared in Preparation Example 2 were injected to a 500 L, high pressure reactor, followed by stirring and making the reactor vacuous. 100 parts by weight (215 kg) of a vinyl chloride monomer was injected to the reactor in a vacuum state, followed by elevating the temperature in the reactor to 58° C. to initiate polymerization. After initiating polymerization, 0.7 parts by weight (1.5 kg) of sodium dodecyl benzene sulfonate was continuously injected to the reactor, followed by stirring for 300 minutes to allow reaction. 0.1 parts by weight of tetrasodium diphosphate (TSDP) relative to 100 parts by weight of the vinyl chloride monomer was injected and introduced to the reactor at a point when a polymerization conversion ratio was 30%. After the pressure in the reactor reached 4.0 kg/cm$^2$, the reaction was finished, and unreacted vinyl chloride monomer was recovered and removed to obtain a vinyl chloride polymer.

Example 2

A vinyl chloride polymer was obtained by conducting the same procedure described in Example 1 except for injecting tetrasodium ethylenediamine tetraacetate (EDTA-4Na) instead of tetrasodium diphosphate (TSDP).

Example 3

A vinyl chloride polymer was obtained by conducting the same procedure described in Example 1 except for injecting trisodium citrate instead of tetrasodium diphosphate (TSDP).

Example 4

A vinyl chloride polymer was obtained by conducting the same procedure described in Example 1 except for injecting 0.1 parts by weight of tetrasodium diphosphate (TSDP) at a point when a polymerization conversion ratio was 80%.

Example 5

A vinyl chloride polymer was obtained by conducting the same procedure described in Example 4 except for injecting 0.3 parts by weight of tetrasodium diphosphate (TSDP).

Example 6

A vinyl chloride polymer was obtained by conducting the same procedure described in Example 4 except for injecting 0.5 parts by weight of tetrasodium diphosphate (TSDP).

Example 7

A vinyl chloride polymer was obtained by conducting the same procedure described in Example 4 except for injecting 0.005 parts by weight of tetrasodium ethylenediamine tetraacetate (EDTA-4Na) instead of tetrasodium diphosphate (TSDP).

Example 8

A vinyl chloride polymer was obtained by conducting the same procedure described in Example 4 except for injecting 0.01 parts by weight of tetrasodium ethylenediamine tetraacetate (EDTA-4Na) instead of tetrasodium diphosphate (TSDP).

Example 9

A vinyl chloride polymer was obtained by conducting the same procedure described in Example 4 except for injecting 0.1 parts by weight of tetrasodium ethylenediamine tetraacetate (EDTA-4Na) instead of tetrasodium diphosphate (TSDP).

Example 10

A vinyl chloride polymer was obtained by conducting the same procedure described in Example 4 except for injecting 0.3 parts by weight of tetrasodium ethylenediamine tetraacetate (EDTA-4Na) instead of tetrasodium diphosphate (TSDP).

Example 11

A vinyl chloride polymer was obtained by conducting the same procedure described in Example 4 except for injecting 0.5 parts by weight of tetrasodium ethylenediamine tetraacetate (EDTA-4Na) instead of tetrasodium diphosphate (TSDP).

Example 12

A vinyl chloride polymer was obtained by conducting the same procedure described in Example 4 except for injecting 0.1 parts by weight of trisodium citrate instead of tetrasodium diphosphate (TSDP).

Example 13

A vinyl chloride polymer was obtained by conducting the same procedure described in Example 4 except for injecting 0.3 parts by weight of trisodium citrate instead of tetrasodium diphosphate (TSDP).

Example 14

A vinyl chloride polymer was obtained by conducting the same procedure described in Example 4 except for injecting 0.5 parts by weight of trisodium citrate instead of tetrasodium diphosphate (TSDP).

Example 15

A mixture obtained by mixing 0.68 parts by weight (3 kg) of sodium lauryl sulfate, 1.36 parts by weight (6 kg) of fatty acid alcohol, and 59 parts by weight (260 kg) of de-ionized water were injected to a reactor having an internal volume of 1 m$^3$ and equipped with a stirrer, and 2.7 parts by weight (12 kg) of di-2-ethyl hexyl peroxydicarbonate, and 100 parts by weight (440 kg) of a vinyl chloride monomer were added thereto, followed by vigorous stirring. A homogenizer was operated so that a total pressure of 1,400 psi was distributed to a front end and a rear end in a ratio of 1:1 to allow homogenizing. After that, the reactant was moved to a reactor having an internal volume of 1 m$^3$, the temperature was elevated to 45° C., and polymerization was initiated. 0.1 parts by weight of tetrasodium diphosphate (TSDP) was injected at a point when a polymerization conversion ratio was 30% to be introduced to the reaction. After the pressure in the reactor reached 4.0 kg/cm$^2$, the reaction was finished, and unreacted vinyl chloride monomer was recovered and removed to obtain a vinyl chloride polymer.

Example 16

A vinyl chloride polymer was obtained by conducting the same procedure described in Example 15 except for injecting tetrasodium ethylenediamine tetraacetate (EDTA-4Na) instead of tetrasodium diphosphate (TSDP).

Example 17

A vinyl chloride polymer was obtained by conducting the same procedure described in Example 15 except for injecting trisodium citrate instead of tetrasodium diphosphate (TSDP).

Example 18

A vinyl chloride polymer was obtained by conducting the same procedure described in Example 15 except for injecting tetrasodium diphosphate (TSDP) at a point when a polymerization conversion ratio was 80%.

Example 19

A vinyl chloride polymer was obtained by conducting the same procedure described in Example 18 except for injecting tetrasodium ethylenediamine tetraacetate (EDTA-4Na) instead of tetrasodium diphosphate (TSDP).

Example 20

A vinyl chloride polymer was obtained by conducting the same procedure described in Example 18 except for injecting trisodium citrate instead of tetrasodium diphosphate (TSDP).

Example 21

124 parts by weight (230 kg) of polymerization water, 0.4 parts by weight (740 g) of a first emulsifier (sodium lauryl sulfate) and 0.059 parts by weight (110 g) of potassium persulfate (KPS) were injected to a 500 L, high pressure reactor, followed by stirring and making the reactor vacuous. 100 parts by weight (185 kg) of a vinyl chloride monomer was injected to the reactor in a vacuum state, followed by elevating the temperature in the reactor to 56° C. to initiate polymerization. 0.1 parts by weight of tetrasodium diphosphate (TSDP) was injected so as to be introduced to the reaction at a point when a polymerization conversion ratio was 30%. After initiating polymerization, 6 parts by weight (11.1 kg) of a second emulsifier (sodium lauryl sulfate) was continuously injected to the reactor for 5 hours. After the pressure in the reactor reached 4 kg/cm$^2$, the reaction was finished, and unreacted vinyl chloride monomer was recovered and removed to obtain a vinyl chloride polymer.

Example 22

A vinyl chloride polymer was obtained by conducting the same procedure described in Example 21 except for injecting tetrasodium ethylenediamine tetraacetate (EDTA-4Na) instead of tetrasodium diphosphate (TSDP).

Example 23

A vinyl chloride polymer was obtained by conducting the same procedure described in Example 21 except for injecting trisodium citrate instead of tetrasodium diphosphate (TSDP).

Example 24

A vinyl chloride polymer was obtained by conducting the same procedure described in Example 21 except for injecting 0.05 parts by weight of tetrasodium diphosphate (TSDP) at a point when a polymerization conversion ratio was 80%.

Example 25

A vinyl chloride polymer was obtained by conducting the same procedure described in Example 21 except for injecting 0.1 parts by weight of tetrasodium diphosphate (TSDP) at a point when a polymerization conversion ratio was 80%.

Example 26

A vinyl chloride polymer was obtained by conducting the same procedure described in Example 21 except for injecting 0.2 parts by weight of tetrasodium diphosphate (TSDP) at a point when a polymerization conversion ratio was 80%.

Example 27

A vinyl chloride polymer was obtained by conducting the same procedure described in Example 24 except for injecting 0.1 parts by weight of tetrasodium ethylenediamine tetraacetate (EDTA-4Na) instead of tetrasodium diphosphate (TSDP).

Example 28

A vinyl chloride polymer was obtained by conducting the same procedure described in Example 24 except for injecting 0.1 parts by weight of trisodium citrate instead of tetrasodium diphosphate (TSDP).

Comparative Example 1

A vinyl chloride polymer was obtained by conducting the same procedure described in Example 1 except for not injecting tetrasodium diphosphate (TSDP).

Comparative Example 2

A vinyl chloride polymer was obtained by conducting the same procedure described in Example 1 except for injecting tetrasodium diphosphate (TSDP) together with a vinyl chloride monomer before initiating polymerization.

Comparative Example 3

A vinyl chloride polymer was obtained by conducting the same procedure described in Comparative Example 2 except for injecting tetrasodium ethylenediamine tetraacetate (EDTA-4Na) instead of tetrasodium diphosphate (TSDP).

Comparative Example 4

A vinyl chloride polymer was obtained by conducting the same procedure described in Comparative Example 2 except for injecting trisodium citrate instead of tetrasodium diphosphate (TSDP).

Comparative Example 5

A vinyl chloride polymer was obtained by conducting the same procedure described in Example 15 except for not injecting tetrasodium diphosphate (TSDP).

Comparative Example 6

A vinyl chloride polymer was obtained by conducting the same procedure described in Example 15 except for injecting tetrasodium diphosphate (TSDP) together with a vinyl chloride monomer before initiating polymerization.

Comparative Example 7

A vinyl chloride polymer was obtained by conducting the same procedure described in Comparative Example 6 except for injecting tetrasodium ethylenediamine tetraacetate (EDTA-4Na) instead of tetrasodium diphosphate (TSDP).

Comparative Example 8

A vinyl chloride polymer was obtained by conducting the same procedure described in Comparative Example 6 except for injecting trisodium citrate instead of tetrasodium diphosphate (TSDP).

Comparative Example 9

A vinyl chloride polymer was obtained by conducting the same procedure described in Comparative Example 21 except for not injecting tetrasodium diphosphate (TSDP).

Comparative Example 10

A vinyl chloride polymer was obtained by conducting the same procedure described in Example 21 except for injecting tetrasodium diphosphate (TSDP) together with a vinyl chloride monomer before initiating polymerization.

Comparative Example 11

A vinyl chloride polymer was obtained by conducting the same procedure described in Comparative Example 10 except for injecting tetrasodium ethylenediamine tetraacetate (EDTA-4Na) instead of tetrasodium diphosphate (TSDP).

Comparative Example 12

A vinyl chloride polymer was obtained by conducting the same procedure described in Comparative Example 10 except for injecting trisodium citrate instead of tetrasodium diphosphate (TSDP).

Experimental Examples

Physical properties of vinyl chloride polymers prepared in Examples 1 to 28 and Comparative Examples 1 to 12 were measured, compared and analyzed, and the results are shown in the following Tables 1, 2 and 3.

1) Viscosity

The viscosity of the vinyl chloride polymers of Examples 1 to 28 and Comparative Examples 1 to 12 were compared and analyzed.

For the vinyl chloride polymers prepared in Examples 1 to 28 and Comparative Examples 1 to 12, 100 g of each vinyl chloride polymer and 60 g of dioctyl phthalate (DOP) were stirred using a Werke mixer (Eurostar IKA) at 800 rpm for 10 minutes to prepare a plastisol.

The viscosity of each plastisol thus prepared was measured using a viscometer (AR2000EX peltier plate, 40 mm parallel plate, gap 500 μm).

2) Thermal Stability

The thermal stability of each vinyl chloride polymer prepared in Examples 1 to 28 and Comparative Examples 1 to 12 was compared and analyzed. The thermal stability of each vinyl chloride polymer was analyzed based on yellowness index.

Figure 4:
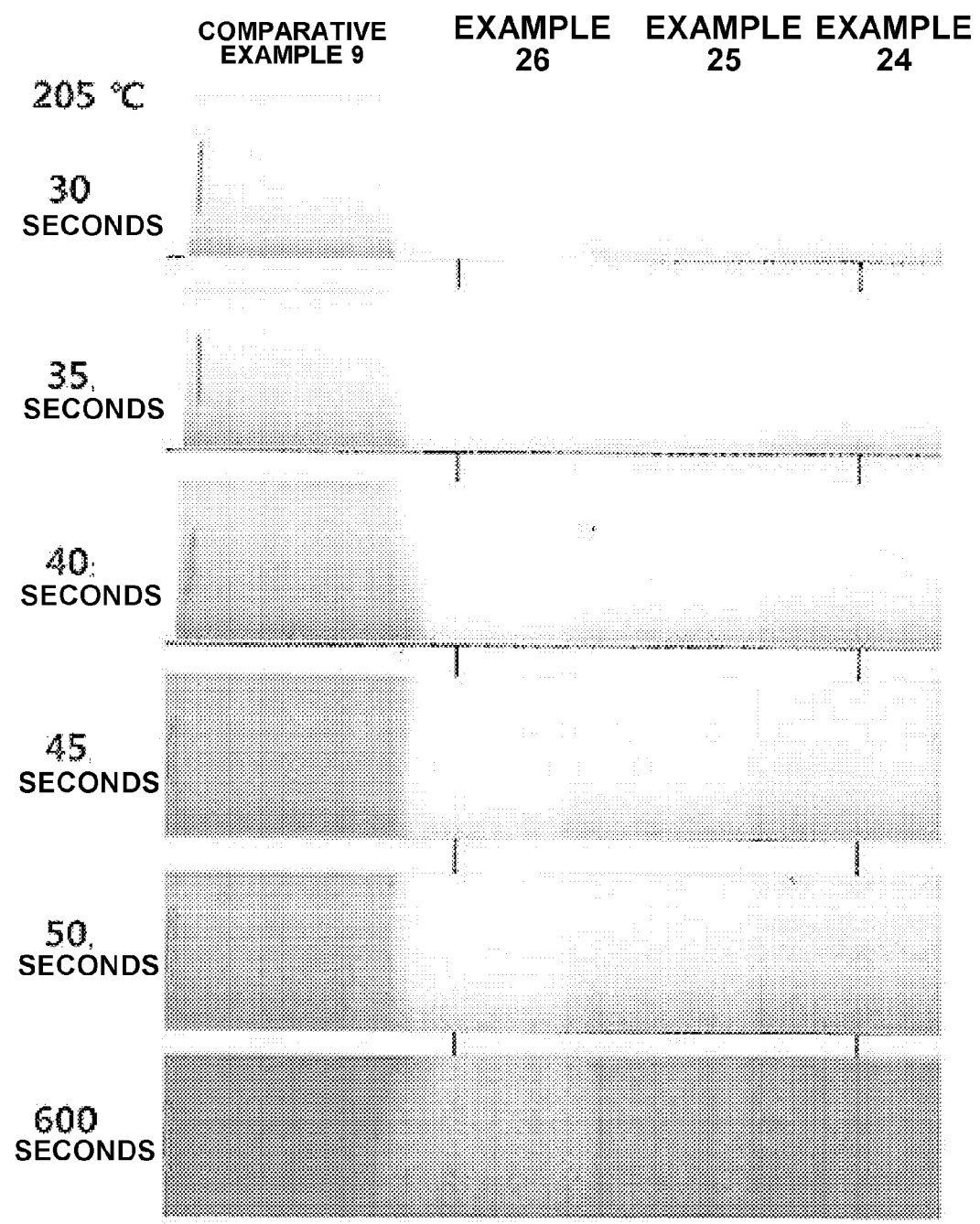
FIG. 4 illustrates the color change of vinyl chloride polymer sheets formed according to Examples 24 to 26 of the present invention and Comparative Example 9 with respect to time.

Particularly, the thermal stability was measured using each plastisol prepared in 1) for each vinyl chloride polymer of Examples 1 to 28 and Comparative Examples 1 to 12. Each plastisol was spread on a release paper and coated using a 0.5 mm rod, and then, dried at 150° C. for 45 seconds using a Mathis oven to manufacture a pregelling sheet. Heat was applied at 205° C. to each sheet thus manufactured, and change was observed with respect to time lapse of 60 seconds, 80 seconds, 110 seconds, 120 seconds, 150 seconds, 180 seconds and 210 seconds. The results are shown in Tables 1 and FIG. 4. In addition, yellowness index was measured at 120 seconds using a colorimeter.

3) Dehydrochlorination Amount 10 g of each vinyl chloride polymer according to Examples 1 to 28 and Comparative Examples 1 to 12 was injected to a small reactor and was heated to 180° C. The hydrochloric acid thus produced was collected in 200 mL of distilled water and the pH thereof was measured to calculate the amount of hydrochloric acid produced.

4) Generated Amount of Scale

Each vinyl chloride polymer of Examples 15 to 28 and Comparative Examples 5 to 12 was filtered using a 45 mesh, and the amount of impurities did not go through was measured.

TABLE 1

| Division | Viscosity (Pa · s) | Thermal stability (Y · I) | Dehydrochlorination amount (mol/L, ×10$^{-6}$) |
|---|---|---|---|
| Example 1 | 3.4 | 73 | 1.3 |
| Example 2 | 3.3 | 69 | 1.5 |
| Example 3 | 3.4 | 67 | 1.6 |
| Example 4 | 3.0 | 72 | 1.3 |
| Example 5 | 3.1 | 63 | 1.2 |
| Example 6 | 3.1 | 60 | 1.1 |
| Example 7 | 3.2 | 98 | 1.9 |
| Example 8 | 3.2 | 87 | 1.8 |
| Example 9 | 3.9 | 62 | 1.5 |
| Example 10 | 8.8 | 52 | 1.4 |
| Example 11 | 12.0 | 51 | 1.2 |
| Example 12 | 2.9 | 63 | 1.35 |
| Example 13 | 3.1 | 59 | 1.31 |
| Example 14 | 3.1 | 52 | 1.3 |
| Comparative Example 1 | 3.1 | 124 | 2.4 |
| Comparative Example 2 | 3.6 | 116 | 2.2 |
| Comparative Example 3 | 3.3 | 105 | 2.0 |
| Comparative Example 4 | 3.4 | 108 | 2.2 |

As shown in Table 1, the vinyl chloride polymers of Examples 1 to 14 prepared via micro-seed emulsion polymerization using a modifier according to the present invention have a decreased amount of dehydrochlorination and markedly improved thermal stability (markedly low yellowness index) when compared to the vinyl chloride polymer prepared in Comparative Examples 1 to 4.

Particularly, the vinyl chloride polymer of Comparative Example 1 prepared by not adding any modifier suggested in the present invention has an increased amount of dehydrochlorination and markedly deteriorated thermal stability when compared to those of the vinyl chloride polymers of Examples 1 to 15.

In addition, the vinyl chloride polymers of Comparative Examples 2 to 4 prepared by injecting the modifier suggested in the present invention, however injecting the modifier together with the vinyl chloride monomer before initiating polymerization not after initiating polymerization have an increased amount of dehydrochlorination and markedly deteriorated thermal stability when compared to those of the vinyl chloride polymers of Examples 1 to 14.

Meanwhile, among the vinyl chloride polymers of Examples 1 to 14 prepared by adding the modifier suggested in the present invention, the vinyl chloride polymers of Examples 5 to 14 prepared by injecting the modifier at a point when a polymerization conversion ratio was 80% or more have a less amount of dehydrochlorination and better thermal stability when compared to those of the vinyl chloride polymers of Examples 1 to 3 prepared by adding the modifier at a point when a polymerization conversion ratio was 30%. The results mean that the physical properties of the vinyl chloride polymers may be improved by adding the modifier, and vinyl chloride polymers having more preferable physical properties may be obtained by controlling the injection time of the modifier.

TABLE 2

| Division | Viscosity (Pa · s) | Thermal stability (Y · I) | Dehydrochlorination amount (mol/L, ×10$^{-6}$) | Scale generation amount (g) |
|---|---|---|---|---|
| Example 15 | 4.4 | 41 | 1.4 | 85 |
| Example 16 | 4.3 | 51 | 1.5 | 80 |
| Example 17 | 4.5 | 50 | 1.4 | 85 |
| Example 18 | 4.5 | 50 | 1.4 | 85 |
| Example 19 | 4.1 | 34 | 1.1 | 60 |
| Example 20 | 4.6 | 32 | 1.2 | 50 |
| Comparative Example 5 | 4.1 | 70 | 2.2 | 50 |
| Comparative Example 6 | 4.7 | 101 | 2.2 | 100 |
| Comparative Example 7 | 13.0 | 105 | 2.1 | 140 |
| Comparative Example 8 | 7.6 | 110 | 2.7 | 130 |

As shown in Table 2, the vinyl chloride polymers of Examples 15 to 20 prepared via emulsion polymerization (microemulsion polymerization) using the modifier according to the present invention have a decreased generation degree of scale, a decreased generation amount of dehydrochlorination, and improved thermal stability (markedly low yellowness index) when compared to those of the vinyl chloride polymers prepared in Comparative Examples 5 to 8.

Particularly, the vinyl chloride polymer of Comparative Example 5 prepared by not adding any modifier suggested in the present invention has an increased amount of dehydrochlorination and deteriorated thermal stability when compared to those of the vinyl chloride polymers of Examples 15 to 20.

In addition, the vinyl chloride polymers of Comparative Examples 6 to 8 prepared by injecting the modifier suggested in the present invention, however injecting the modifier together with the vinyl chloride monomer before initiating polymerization not after initiating polymerization have an increased amount of dehydrochlorination and markedly deteriorated thermal stability when compared to those of the vinyl chloride polymers of Examples 15 to 20.

Among the vinyl chloride polymers of Examples 15 to 20 prepared by adding the modifier suggested in the present invention, the vinyl chloride polymers of Examples 18 to 20 prepared by injecting the modifier at a point when a polymerization conversion ratio was 80% or more have a decreased amount of dehydrochlorination and better thermal stability when compared to those of the vinyl chloride polymers of Examples 15 to 17 prepared by adding the modifier at a point when a polymerization conversion ratio was 30%. The results mean that the physical properties of the vinyl chloride polymers may be improved by adding the modifier, and vinyl chloride polymers having more preferable physical properties may be obtained by controlling the injection time of the modifier.

TABLE 3

| Division | Viscosity (Pa · s) | Thermal stability (Y · I) | Dehydro-chlorination amount (mol/L, ×10⁻⁶) | Scale generation amount (g) |
|---|---|---|---|---|
| Example 21 | 53 | 55 | 1.5 | 100 |
| Example 22 | 51 | 55 | 1.3 | 90 |
| Example 23 | 52 | 58 | 1.2 | 95 |
| Example 24 | 52 | 80 | 1.4 | 65 |
| Example 25 | 53 | 65 | 1.2 | 45 |
| Example 26 | 53 | 51 | 1.2 | 55 |
| Example 27 | 65 | 52 | 1.3 | 50 |
| Example 28 | 52 | 51 | 1.3 | 60 |
| Comparative Example 9 | 32 | 100 | 2.5 | 65 |
| Comparative Example 10 | 59 | 91 | 2.4 | 110 |
| Comparative Example 11 | 79 | 96 | 2.3 | 105 |
| Comparative Example 12 | 65 | 102 | 2.3 | 110 |

As shown in Table 3, the vinyl chloride polymers of Examples 21 to 28 prepared via emulsion polymerization (pure emulsion polymerization) using the modifier according to the present invention have a markedly decreased generation degree of scale, a decreased amount of generation of dehydrochlorination, and markedly improved thermal stability (markedly low yellowness index) when compared to those of the vinyl chloride polymers prepared in Comparative Examples 9 to 12.

Particularly, the vinyl chloride polymers of Examples 21 to 28 according to the present invention have a markedly small amount of dehydrochlorination and markedly improved thermal stability when compared to those of the vinyl chloride polymer of Comparative Example 9 prepared by not adding any modifier suggested in the present invention.

In addition, the vinyl chloride polymers of Comparative Examples 10 to 12 prepared by adding the modifier suggested in the present invention, however injecting the modifier together with the vinyl chloride monomer before initiating polymerization not after initiating polymerization have an increased amount of dehydrochlorination and markedly deteriorated thermal stability when compared to those of the vinyl chloride polymers of Examples 21 to 28.

Meanwhile, among the vinyl chloride polymers of Examples 21 to 28 prepared by adding the modifier suggested in the present invention, the vinyl chloride polymers of Examples 24 to 28 prepared by injecting the modifier at a point when a polymerization conversion ratio was 80% or more have a decreased generation amount of scale, a decreased generation amount of dehydrochlorination and better thermal stability when compared to those of the vinyl chloride polymers of Examples 21 to 23 prepared by adding the modifier at a point when a polymerization conversion ratio was 30%. The results mean that the physical properties of the vinyl chloride polymers may be improved by adding the modifier, and vinyl chloride polymers having more preferable physical properties may be obtained by controlling the injection time of the modifier.

The invention claimed is:

1. A method of preparing a vinyl chloride polymer, the method comprising:
    adding a modifier to a vinyl chloride monomer and conducting emulsion polymerization,
    wherein the modifier is added in an amount ratio from 0.001 to 10 parts by weight relative to 100 parts by weight of the vinyl chloride monomer, and
    wherein the modifier is added at a point when a polymerization conversion ratio is 30% or more.

2. The method of preparing a vinyl chloride polymer of claim 1, wherein the modifier is added in an amount ratio from 0.1 to 5 parts by weight relative to 100 parts by weight of the vinyl chloride monomer.

3. The method of preparing a vinyl chloride polymer of claim 1, wherein the modifier is at least one of oxycarboxylates, inorganic phosphates or ethylenediamine tetraacetates.

4. The method of preparing a vinyl chloride polymer of claim 3, wherein the oxycarboxylate is citric acid or trisodium citrate.

5. The method of preparing a vinyl chloride polymer of claim 3, wherein the inorganic phosphate is disodium diphosphate or tetrasodium diphosphate.

6. The method of preparing a vinyl chloride polymer of claim 3, wherein the ethylenediamine tetraacetate is disodium ethylenediamine tetraacetate or tetrasodium ethylenediamine tetraacetate.

7. The method of preparing a vinyl chloride polymer of claim 1, wherein the emulsion polymerization is micro-seed emulsion polymerization, microemulsion polymerization or pure emulsion polymerization.

8. The method of preparing a vinyl chloride polymer of claim 7, wherein the micro-seed emulsion polymerization comprises:
    preparing a seed mixture comprising a first seed and a second seed; and
    adding the vinyl chloride monomer and the modifier to the seed mixture and conducting polymerization,
    wherein the modifier is added after initiating the polymerization.

9. The method of preparing a vinyl chloride polymer of claim 8, wherein the first seed is prepared by injecting 100 parts by weight of the vinyl chloride monomer and 0.1 to 5 parts by weight of a first emulsifier to a reactor filled with a polymerization initiator, homogenizing, and emulsion polymerizing at a temperature from 30° C. to 70° C.

10. The method of preparing a vinyl chloride polymer of claim 8, wherein the first seed has an average particle diameter from 0.5 µm to 1.0 µm.

11. The method of preparing a vinyl chloride polymer of claim 8, wherein the second seed is prepared by
    adding 100 parts by weight of the vinyl chloride monomer to a reactor filled with the first emulsifier, and initiating emulsion polymerization at a temperature from 30° C. to 70° C.; and
    adding continuously a second emulsifier during conducting the emulsion polymerization, and conducting emulsion polymerization for 4 to 10 hours.

12. The method of preparing a vinyl chloride polymer of claim 8, wherein the second seed has an average particle diameter from 0.05 µm to 0.5 µm.

13. The method of preparing a vinyl chloride polymer of claim 8, wherein the seed mixture comprises the first seed and the second seed in an amount ratio from 1:1 to 3:1 by weight.

14. The method of preparing a vinyl chloride polymer of claim 8, wherein the seed mixture is used in an amount ratio from 1 to 20 parts by weight relative to 100 parts by weight of the vinyl chloride monomer.

15. The method of preparing a vinyl chloride polymer of claim 8, wherein the polymerization reaction is conducted while continuously adding the first emulsifier.

16. The method of preparing a vinyl chloride polymer of claim 7, wherein the microemulsion polymerization comprises:
    adding a polymerization initiator, the vinyl chloride monomer, and the modifier to a reactor filled with an emulsifier, homogenizing, and polymerizing;
    wherein the modifier is added after initiating polymerization;
    wherein the polymerization initiator is an oil soluble initiator.

17. The method of preparing a vinyl chloride polymer of claim 16, wherein the emulsifier is added in an amount ratio from 0.1 to 5 parts by weight, and the polymerization initiator is added in an amount ratio from 0.01 to 2 parts by weight relative to 100 parts by weight of the vinyl chloride monomer.

18. The method of preparing a vinyl chloride polymer of claim 7, wherein the pure emulsion polymerization comprises:
    adding the vinyl chloride monomer, the modifier, and a second emulsifier to a reactor filled with a mixture of a first emulsifier, and a water soluble polymerization initiator, and polymerizing,
    wherein the modifier is added after initiating polymerization;
    wherein the polymerizing is conducted while continuously adding the second emulsifier.

19. The method of preparing a vinyl chloride polymer of claim 18, wherein 0.02 to 0.4 parts by weight of the first emulsifier, 0.01 to 2 parts by weight of the water soluble polymerization initiator, and 0.01 to 6 parts by weight of the second emulsifier are added relative to 100 parts by weight of the vinyl chloride monomer.

20. The method of preparing a vinyl chloride polymer of claim 1, wherein the modifier is added at a point when a polymerization conversion ratio is from 80% to 95%.

* * * * *